United States Patent
Zou et al.

(10) Patent No.: US 7,403,526 B1
(45) Date of Patent: Jul. 22, 2008

(54) PARTITIONING AND FILTERING A SEARCH SPACE OF PARTICULAR USE FOR DETERMINING A LONGEST PREFIX MATCH THEREON

(75) Inventors: Xu Zou, Mountain View, CA (US);
Flavio Giovanni Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 10/848,401

(22) Filed: May 17, 2004

(51) Int. Cl.
*H04L 12/56* (2006.01)
*G06F 12/00* (2006.01)
*G06F 17/30* (2006.01)

(52) U.S. Cl. .................. 370/392; 370/395.32; 707/6; 709/238; 711/108

(58) Field of Classification Search ............ 370/392, 370/395.32; 707/6; 709/238; 711/108
See application file for complete search history.

(56) References Cited

U.S. PATENT DOCUMENTS

| | | | |
|---|---|---|---|
| 5,857,196 A | | 1/1999 | Angle et al. |
| 5,930,359 A | | 7/1999 | Kempke et al. |
| 5,983,223 A | * | 11/1999 | Perlman .................. 707/6 |
| 6,052,683 A | * | 4/2000 | Irwin ..................... 707/8 |
| 6,212,184 B1 | * | 4/2001 | Venkatachary et al. ...... 370/392 |
| 6,430,527 B1 | * | 8/2002 | Waters et al. ............. 703/3 |
| 6,526,474 B1 | | 2/2003 | Ross |
| 6,560,610 B1 | | 5/2003 | Eatherton et al. |
| 6,564,211 B1 | * | 5/2003 | Andreev et al. ............ 707/3 |
| 6,570,866 B1 | * | 5/2003 | Murase et al. ............. 370/351 |
| 6,611,832 B1 | * | 8/2003 | van Lunteren ............. 707/3 |
| 6,614,789 B1 | * | 9/2003 | Yazdani et al. ............ 370/392 |
| 6,631,419 B1 | * | 10/2003 | Greene .................... 709/238 |
| 6,658,002 B1 | | 12/2003 | Ross et al. |
| 6,717,946 B1 | | 4/2004 | Hariguchi et al. |
| 6,728,732 B1 | | 4/2004 | Eatherton et al. |
| 6,775,737 B1 | | 8/2004 | Warkhede et al. |
| 6,778,530 B1 | * | 8/2004 | Greene ............... 370/389 |
| 6,871,262 B1 | | 3/2005 | Oren et al. |
| 6,947,931 B1 | * | 9/2005 | Bass et al. ............... 707/6 |
| 6,970,971 B1 | | 11/2005 | Warkhede et al. |

(Continued)

OTHER PUBLICATIONS

Suri et al., "Scalable IP Lookup With Fast Updates," Global Telecommunications Conference, 2001. Globecom '01. vol. 3, pp. 1610-1614.

(Continued)

*Primary Examiner*—Alpus H Hsu
(74) *Attorney, Agent, or Firm*—The Law Office of Kirk D. Williams

(57) ABSTRACT

Disclosed are, inter alia, methods, apparatus, data structures, computer readable media, mechanisms, and means for partitioning and filtering a search space of particular use for determining a longest prefix match thereon, such as for routing packets. One implementation uses one or more filtering mechanisms to filter portions of a lookup word against a first set of lookup values, such as, but not limited to the value of any corresponding portion of any entry in the search space. A set of possible matching prefixes defined by consecutive matching portions of the lookup word from the highest-order position are determined, and lookup operations are typically performed in parallel on each of these possible matching prefixes to generate a set of matching results (if any), which is typically used to identify the longest matching prefix.

24 Claims, 10 Drawing Sheets

U.S. PATENT DOCUMENTS

| | | | |
|---|---|---|---|
| 7,002,965 B1 | 2/2006 | Cheriton | |
| 7,047,317 B1 * | 5/2006 | Huie et al. | 709/245 |
| 7,089,240 B2 * | 8/2006 | Basso et al. | 707/6 |
| 7,289,979 B2 * | 10/2007 | Wilson | 707/2 |
| 2003/0023581 A1 * | 1/2003 | Davis et al. | 707/3 |
| 2004/0008634 A1 | 1/2004 | Rangarajan et al. | |
| 2004/0030803 A1 | 2/2004 | Eatherton et al. | |
| 2004/0044868 A1 * | 3/2004 | Guerrero | 711/164 |
| 2004/0170172 A1 | 9/2004 | Pullela et al. | |
| 2004/0205229 A1 * | 10/2004 | Stojancic | 709/236 |
| 2004/0230583 A1 | 11/2004 | Testa | |
| 2005/0114602 A1 | 5/2005 | Ngai et al. | |
| 2005/0157712 A1 | 7/2005 | Rangarajan et al. | |
| 2005/0175010 A1 * | 8/2005 | Wilson et al. | 370/392 |

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using Music Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

William N. Eatherton, Hardware-Based Internet Protocol Prefix Lookups, Master's thesis, Sever Institute, Washington University, St. Louis, MO, May 1999, 109 pages.

Donald R. Morrison, "PATRICIA —Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM Sigmetrics Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999, ACM Sigcomm'99, Sep. 1999 (12 pages).

Srinivasan et al., "Fast and Scalable Layer Four Switching," ACM Computer Communication Review, 28(4):191-202, 1998. ACM Sigcomm'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

| | |
|---|---|
| 300 ↘ | 301 ↓    302 ↓ |
| 0 | MATCH / NO MATCH INDICATION |
| 1 | MATCH / NO MATCH INDICATION |
| ⋮ | ⋮ |
| 255 | MATCH / NO MATCH INDICATION |

EXAMPLE FILTERING FOR EIGHT BIT FIELD
FIGURE 3A

| 400 → | 401 ↓ | 402 ↓ | 403 ↓ |
|---|---|---|---|
| | 0 | MATCH / NO MATCH INDICATION | TERMINATION OF PREFIX INDICATION |
| | 1 | MATCH / NO MATCH INDICATION | TERMINATION OF PREFIX INDICATION |
| | ⋮ | ⋮ | ⋮ |
| | 255 | MATCH / NO MATCH INDICATION | TERMINATION OF PREFIX INDICATION |

EXAMPLE FILTERING FOR EIGHT BIT FIELD
FIGURE 4A

PARTITIONING AND FILTERING A SEARCH SPACE OF PARTICULAR USE FOR DETERMINING A LONGEST PREFIX MATCH THEREON

TECHNICAL FIELD

One embodiment of the invention relates to communications and computer systems, especially networked routers and computers, packet switching systems, and other devices; and more particularly, one embodiment relates to partitioning and filtering a search space of particular use for determining a longest prefix match thereon, such as for routing packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet forwarding decisions and other packet operations are demanding parts of switch and router design. For example, IP forwarding requires a longest prefix matching computation at wire speeds. The current IP version, IPv4, uses 32-bit destination addresses and a core Internet router can have over 200,000 prefixes. A prefix typically refers to a value which ends in zero or more bits which are "don't care" or wildcard bits (i.e., these wildcard bits are considered to match both a zero and a one). For example, a 32-bit prefix could contain thirty-two bits of zeros and/or ones (i.e., no wildcard bits), or contain less than thirty-two bits with the trailing bits being wildcard bits. These prefixes are typically denoted by a bit string (e.g., 01*) followed by a "*", by a "value/number of relevant bits" (e.g., 01001010/8) to indicate a value of the prefix with the remaining trailing bits after the number of relevant bits being wildcard bits (i.e., do not matter), or by a fully expanded value (e.g., 01000101010101010101010101010101, 45555555 Hex, 69:85:85:85, etc.).

For destination routing, each prefix entry in a routing table typically consists of a prefix and a next hop value. For example, suppose the database consists of two prefix entries: 01-->L1, and 0100/4-->L2. If the router receives a packet with destination address that starts with 0100, the address matches both the first prefix (01*) and the second prefix (0100/4). Because the second prefix is the longest matching prefix in the routing database, the packet should be sent to next hop L2. On the other hand, a packet with destination address that starts with 011 should be sent to next hop L1. The next hop information will typically specify an output port on the router and possibly a data link address.

Various software and hardware implementations are used to identify a longest matching prefix, each typically having a different performance, memory, associative memory requirements, scalability and updating requirements. Needed are new methods and apparatus for identifying a longest matching prefix, which may be particularly useful for certain applications and implementations, and may have one or more advantages over one or more prior implementations.

SUMMARY

Disclosed are, inter alia, methods, apparatus, data structures, computer-readable media, mechanisms, and means for partitioning and filtering a search space of particular use for determining a longest prefix match thereon, such as for routing packets. One embodiment uses one or more filtering mechanisms to filter portions of a lookup word against a first set of lookup values, such as, but not limited to the value of any corresponding portion of any entry in the search space. A set of possible matching prefixes defined by consecutive matching portions of the lookup word from the highest-order position are determined, and lookup operations are typically performed in parallel on each of these possible matching prefixes to generate a set of matching results (if any), which is typically used to identify the longest matching prefix.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3A is a block diagram of data stored in memory for filtering portions of a lookup word used in one embodiment;

FIG. 4A is a block diagram of data stored in memory for filtering portions of a lookup word used in one embodiment;

DETAILED DESCRIPTION

Figure 1A:
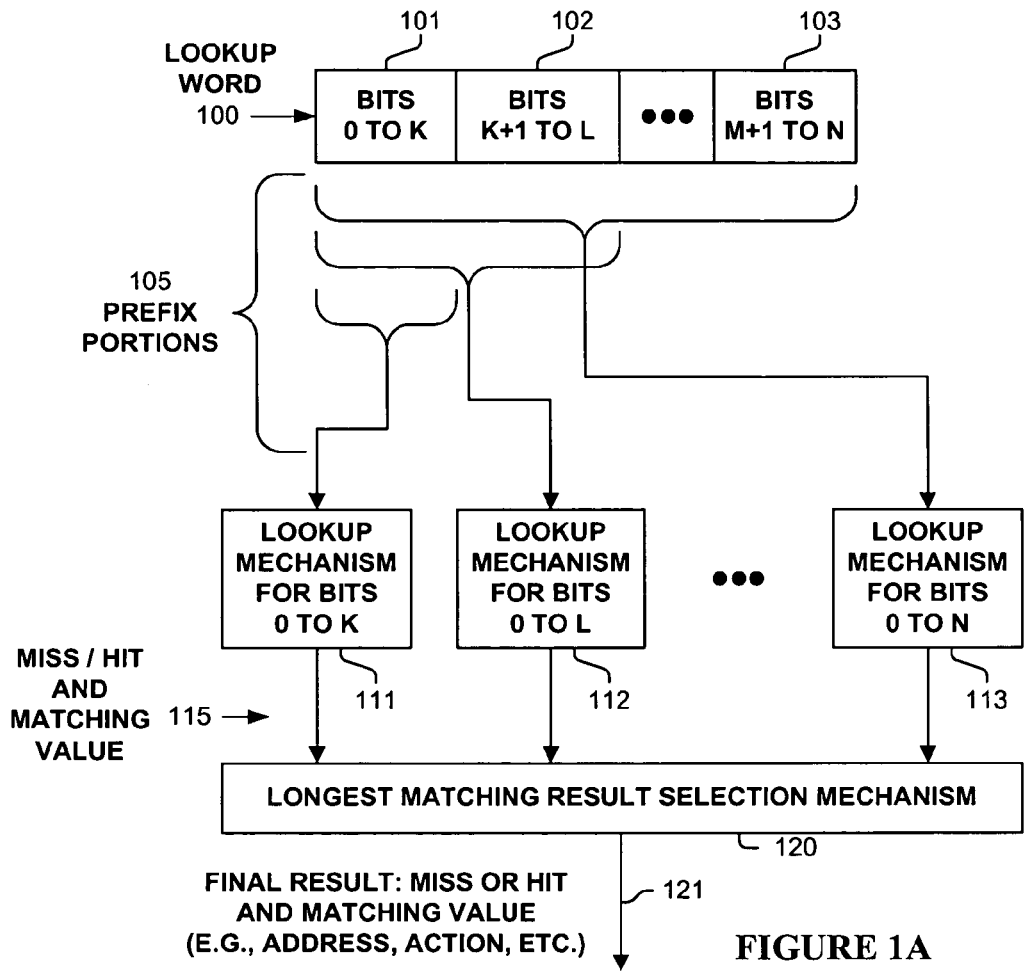
FIG. 1A is a block diagram of a system using one embodiment for partitioning and filtering a search space of particular use for determining a longest prefix match thereon, such as for routing packets.

Disclosed are, inter alia, methods, apparatus, data structures, computer-readable media, mechanisms, and means for partitioning and filtering a search space of particular use for determining a longest prefix match thereon, such as for routing packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for partitioning and filtering a search space of particular use for determining a longest prefix match thereon, such as for routing packets. One embodiment uses one or more filtering mechanisms to filter portions of a lookup word against a first set of lookup values, such as, but not limited to the value of any corresponding portion of any entry in the search space. A set of possible matching prefixes defined by consecutive matching portions of the lookup word from the highest-order position are determined, and lookup operations are typically performed in parallel on each of these possible matching prefixes to generate a set of matching results (if any), which is typically used to identify the longest matching prefix.

One embodiment includes multiple lookup filtering modules configured to identify which portions of a lookup word are matched by pre-programmed matching values. Logic circuitry (e.g., discrete elements, processing element, hardwired AND operations, etc.) is configured to identify matching prefix consecutive portions based on the portions of the lookup word identified as being matched. A first consecutive portion of the matching prefix consecutive portions corresponds to a first of the portions of the lookup word, and each of the remaining of the matching prefix consecutive portions corresponding to the first consecutive portion plus a corresponding one or more subsequent portions of the lookup word. Multiple lookup modules are configured to identify which prefix portions of the lookup word corresponding to the matching prefix consecutive portions identified as being matched are matched by pre-programmed values.

In one embodiment, a selection mechanism is configured to identify the longest of the prefix portions identified as being matched by pre-programmed values. In one embodiment, the pre-programmed matching values are values of any possible matching prefix for corresponding portions of the lookup word. In one embodiment, the filtering modules are configured to identify which of the portions of the lookup word terminate a possible matching prefix. In one embodiment, a particular one of the lookup modules is configured not to perform a lookup operation when a corresponding prefix portion of the lookup word is not identified as terminating a possible matching prefix. In one embodiment, the portions of the lookup word are non-overlapping portions of the lookup word. In one embodiment, each of the filtering modules include a memory configured to store an indication for each possible value of a corresponding the portion of the lookup word, the indication identifying whether or not any of the pre-programmed values has the corresponding possible value for that corresponding portion of the lookup word. In one embodiment, the configuration to identify which prefix portions are matched by the pre-programmed values includes the lookup modules being configured to perform a memory, hash table, or associative memory lookup operation based on the prefix portions on the corresponding space identified by the pre-programmed values.

In one embodiment, each of the lookup filtering modules is configured to operate on a different portion of the lookup word. In one embodiment, each of the lookup modules is configured to operate on a different prefix portion of the prefix portions. In one embodiment, each of the different prefix portions corresponds to a prefix ending in a different one of the different portions of the lookup word.

One embodiment includes one or more filtering mechanisms configured to identify which of multiple prefix portions of a lookup word possibly will result in a matching prefix based on pre-programmed matching values. Multiple lookup mechanisms are used to determine which of the identified prefix portions are matched by pre-programmed values. A selection mechanism is used to identify a longest of the determined matching identified prefix portions.

In one embodiment, the pre-programmed matching values are values of any possible longest matching prefix for corresponding prefix portions of the lookup word. In one embodiment, the one or more filtering mechanisms are configured to identify which of the prefix portions of the lookup word terminate a possible matching prefix. In one embodiment, a particular one of the lookup mechanisms is configured not to perform a lookup operation when a corresponding prefix portion of the lookup word is not identified as terminating a possible matching prefix.

One embodiment performs lookup operations based on a lookup word on a space identified by multiple matching values. For each of multiple non-overlapping portions of the lookup word, a determination is made whether or not a value of a corresponding portion of any of the matching values matches. Based on these results, prefix portions of the lookup word on which to perform a search in corresponding subsets of multiple subsets of the matching values are identified, with the prefix portions including a highest-order portion of non-overlapping portions of the lookup word and one or more other prefix portions each including the highest-order portion and one or more consecutive non-overlapping portions of the lookup word from the highest-order portion. A search is performed on each of the prefix portions in its respective corresponding subset to identify whether or not a prefix within the matching values is matched. In one embodiment, a longest of the prefix portions that are matched is identified. One embodiment maintains for each particular portion of the non-overlapping portions of the lookup word, a data structure indicating for which possible values a corresponding portion of any of the matching values matches.

One embodiment performs lookup operations based on a lookup word on a space identified by multiple matching values. For each of multiple non-overlapping portions of the lookup word, a determination is made whether or not a value of a corresponding portion of any of the matching values matches and whether or not the matching value terminates a prefix in the matching values. Based on these results, prefix portions of the lookup word on which to perform a search in corresponding subsets of multiple subsets of the matching values are identified, with a last portion of each of the plurality of prefix portions corresponding to a non-overlapping portion of the lookup word that was determined to match and terminates a prefix. A search is performed on each of the prefix portions in its respective corresponding subset to identify whether or not a prefix within the matching values is matched. In one embodiment, a longest of the prefix portions that are matched is identified. One embodiment maintains for each particular portion of the non-overlapping portions of the lookup word, a data structure indicating for which possible values a corresponding portion of any of the matching values matches.

Turning to the figures, FIG. 1A is a block diagram of a system using one embodiment for partitioning and filtering a search space of particular use for determining a longest prefix match thereon, such as for routing packets. Lookup word 100 includes multiple portions 101-103.

In one embodiment, a portions is defined as being non-overlapping (e.g., have no bits in common), while in one embodiment, two or more of these portions can be overlapping. In one embodiment, these portions include contiguous bits within the lookup word, while in one embodiment, one or more portions includes non-contiguous bits. Also, typically all bits of a lookup word are included in one or more filtering operations, while in one embodiment, not all bits are used for filtering operations to reduce the search space (but are used in identifying the longest matching prefix).

Also illustrated in FIG. 1A are prefix portions 105 of lookup word 100. A prefix portion includes the high-order/first portion 101 of lookup word 100 plus one or more other portions 102-103.

In one embodiment, each of the prefix portions 105 is provided to a different lookup mechanism 111-113 for performing a longest matching prefix lookup operation, typically in parallel with lookup operations in other lookup mechanism to generate results 115 (e.g., typically hit/miss indications and matching values). Any known or future developed lookup mechanism can be used, such as that using devices and methods such as, but not limited to memory, associative memory, hashing, tree bitmap, mtrie, etc.

Longest matching result selection mechanism 120 (e.g., a priority encoder) is used to identify the longest matching prefix result 121 from results 115.

Figure 1B:
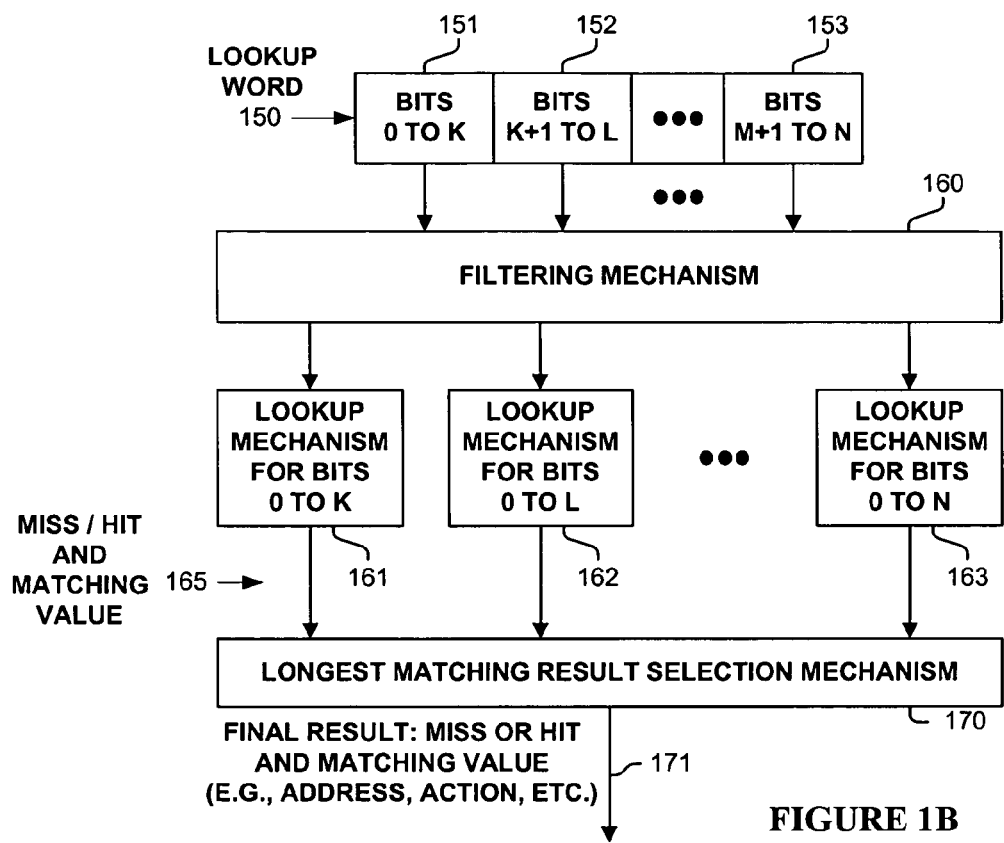
FIG. 1B is a block diagram of a system using one embodiment for partitioning and filtering a search space of particular use for determining a longest prefix match thereon.

FIG. 1B is a block diagram of a system using one embodiment for partitioning and filtering a search space of particular use for determining a longest prefix match thereon. As shown, lookup word 150 includes multiple portions 151-153.

Filtering mechanism 160 is used to identify which of the portions 151-153 can possibly result in a match, and thus resources should be used to perform a longest matching prefix lookup operation on prefix portions of lookup word 150 containing such possibly matching portions 151-153. For example, if no matching prefix in the lookup space contains a value that matches the value of portion 151 of a particular lookup word, then there is no possible matching prefix and lookup operations are not required to perform any lookup operation in lookup mechanisms 161-163. However, assume for one value of lookup word 150 that only portions 151 and 152 match corresponding values of corresponding portions of one or more prefixes in the lookup space. If each portion is identified independently of other portions, then filtering mechanism 160 will not identify if corresponding portions of a single prefix or multiple prefixes matched each portion (which will be determined by lookup mechanism 111-112). Rather, this operation possibly reduces the search space and thus, possibly reduces the number of longest matching prefix lookup operations that must be performed. So, in this example, lookup operations will be performed in lookup mechanisms 161 and 162, and there is no reason typically for this value of lookup word 150 to perform lookup operations in other lookup mechanisms as filtering mechanism 160 identified that a matching prefix could only span at most L+1 bits in this example. However, in one embodiment, a lookup operation is performed in the next contiguous lookup mechanism to accommodate prefixes that do not fully span the width of the corresponding portion of the lookup word.

The lookup results 165 of lookup operations in one or more of lookup mechanisms 161-163 are used by longest matching result selection mechanism 170 (e.g., a priority encoder) to identify the longest matching prefix result 171.

Figure 2A:
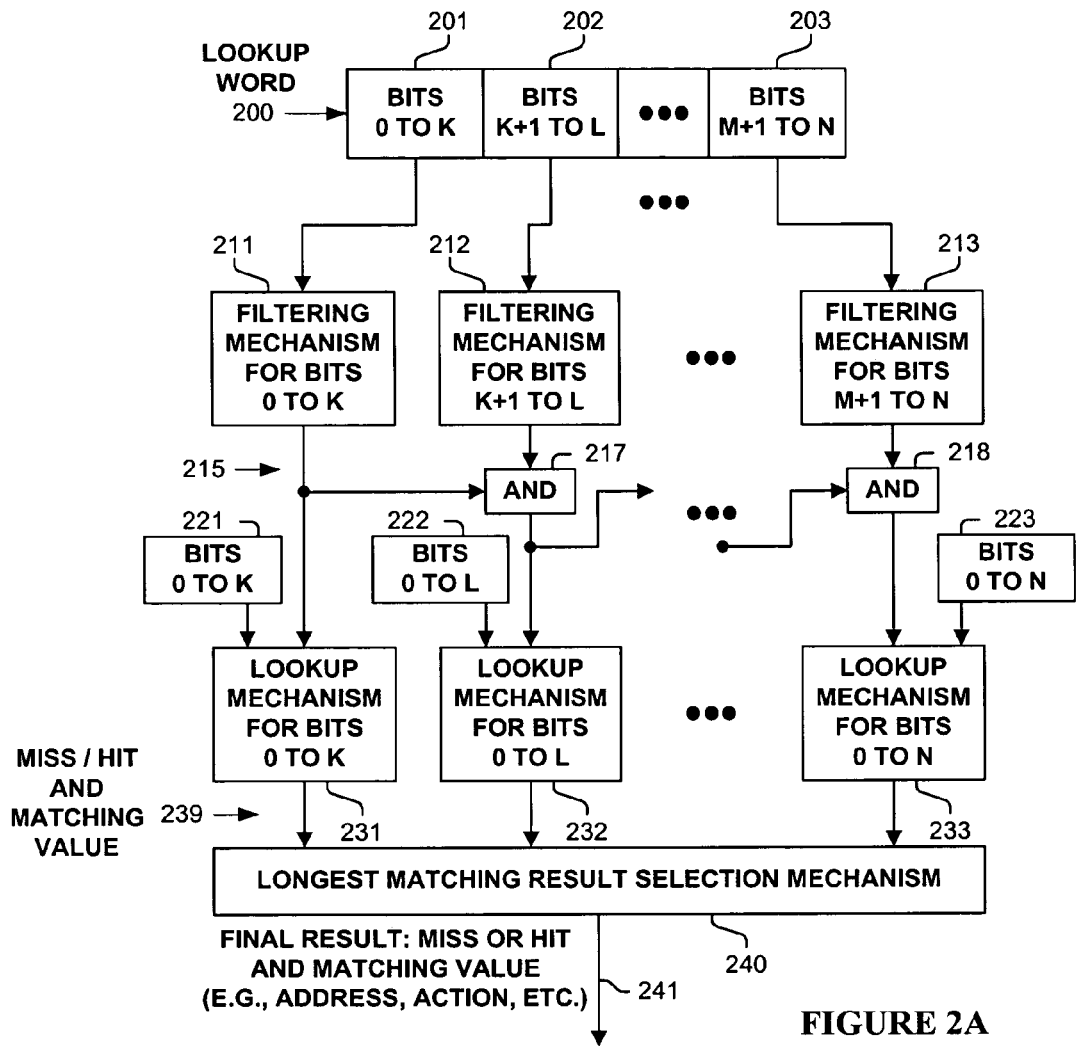
FIG. 2A is a block diagram of a system using one embodiment for partitioning and filtering a search space of particular use for determining a longest prefix match thereon.

FIG. 2A is a block diagram of a system using one embodiment for partitioning and filtering a search space of particular use for determining a longest prefix match thereon. As shown, lookup word 200 includes multiple portions 201-203. In one embodiment, each of portions 201-203 has a corresponding filtering mechanism 211-213 for identifying whether or not at least one of the prefixes in the search space has a value matching the corresponding portion of a value of lookup word 200.

For example, FIG. 3A illustrates data stored in memory for filtering portions of a lookup word used in one embodiment. For example, if a portion includes eight bits, then there are 256 possible values. One embodiment, thus uses a memory or data structure 300 indexed by the value 301 of the portion, and includes an indication 302 (e.g., a bit) of whether or not a corresponding portion of at least one of the prefixes in the search space has a corresponding value. If a portion of a prefix has no wildcard bits, then it corresponds to a single value to be indicated in data structure 300. If a portion of a prefix has n wildcard bits, with n being at least one, then the portion corresponds to two raised to the nth power (e.g., 101001/6 in an eight bit field corresponds to the four values of 10100100, 10100101, 10100110, and 10100111). Data structure 300 is simple to maintain, and one embodiment also keeps a count of the number of prefixes having each value so it can be easily updated when prefixes are added and removed from the search space.

Returning to FIG. 2A, a lookup operation is performed in filtering mechanisms 211-213 to generate results 215 used for determining which lookup mechanisms 231-233 contain possible matching prefixes. In one embodiment, only the lookup mechanisms 231-233 containing possible matching prefixes perform lookup operations (e.g., to save power, time, allow updating or maintenance to be performed on the other lookup mechanisms, etc.); while one embodiment, performs a lookup operation in at least one additional of the lookup mechanisms 231-233. The determination of whether a lookup mechanism may result in a match may be readily determined based on results 215 as for a particular lookup mechanism, its filtering mechanism and all filtering mechanisms for previous portions of the lookup word must have been identified by the corresponding one(s) of filtering mechanisms 211-213, and thus a set of AND gates (e.g., 217, 218) or other optimized logic circuitry is typically used.

Figure 2B:
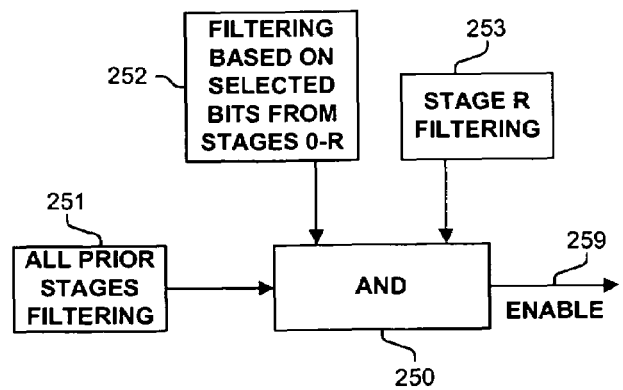
FIG. 2B is a block diagram of exemplary logic circuitry used in one embodiment to identify whether a search should be performed on a particular prefix portion of the lookup word.

FIG. 2B is a block diagram of exemplary logic circuitry used in one embodiment to identify whether a search should be performed on a particular prefix portion of the lookup word. As shown, the combined result 251 from all filtering of prior portions of the lookup word is ANDed with the filtering result 253 of the current stage (denoted as stage R) to generate the enable signal 259 (i.e., a possible match in this corresponding prefix portion of the lookup word so perform the lookup, or no possible match). In addition, one embodiment also includes additional filtering of some bits from any of the stages 0-R such as which includes bits from different portions of the lookup word, and thus this result 252 is further used as input to AND mechanism 250.

Lookup operations are then performed in lookup mechanisms 231-233 which are identified as having a possible matching prefix. Note, bits 221-223 are corresponding prefix portions of lookup word 200 and drawn in this representation for simplicity and ease of reader understanding.

The lookup results 239 of lookup operations in one or more of lookup mechanisms 231-233 are used by longest matching result selection mechanism 240 (e.g., a priority encoder) to identify the longest matching prefix result 241.

Figure 3B:
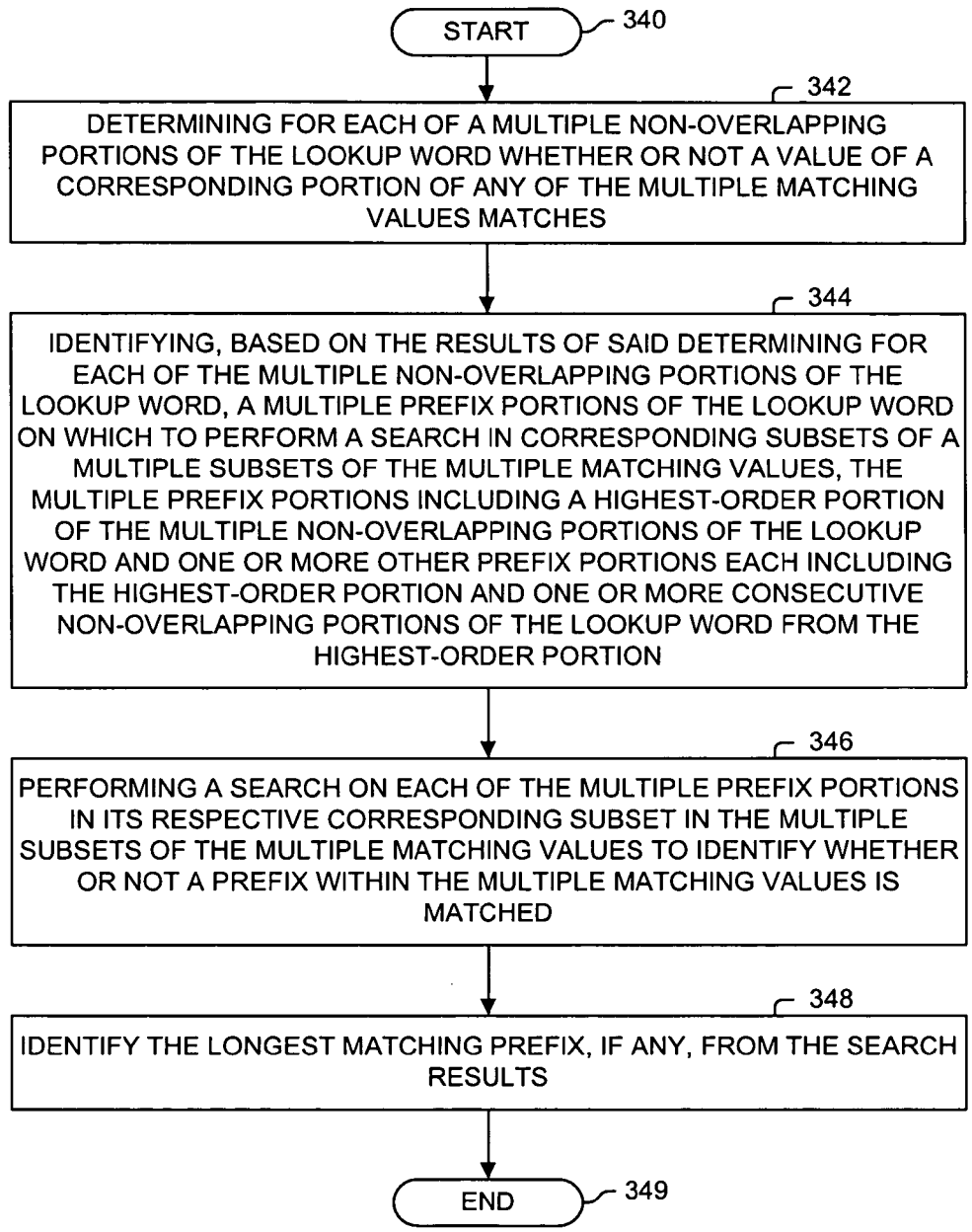
FIG. 3B is a flow diagram of a process used in one embodiment for partitioning and filtering a search space of particular use for determining a longest prefix match thereon.

FIG. 3B is a flow diagram of a process used in one embodiment for partitioning and filtering a search space of particular use for determining a longest prefix match thereon. Processing begins with process block 340, and proceeds to process block 342, wherein a determination is made whether or not a value of a corresponding portion of any of the matching values matches for each of multiple non-overlapping portions of the lookup word. In process block 344, based on these results, prefix portions of the lookup word on which to perform a search in corresponding subsets of multiple subsets of the matching values are identified, with the prefix portions including a highest-order portion of non-overlapping portions of the lookup word and one or more other prefix portions each including the highest-order portion and one or more consecutive non-overlapping portions of the lookup word from the highest-order portion. In process block 346, a search is performed on each of the prefix portions in its respective corresponding subset to identify whether or not a prefix within the matching values is matched. In process block 348, a longest of the prefix portions that are matched is identified. Processing is complete as indicated by process block 349.

Returning to FIG. 2A, the filtering mechanisms 211-213 used in one embodiment not only identify whether a corresponding portion of a lookup word is matched a corresponding portion of one or more prefixes in the search space, but also whether that corresponding portion terminates a prefix (i.e., a matching prefix in the search space has no more subsequent bits) in the search space. For example, assume that a lookup word is a 256-bit address, and each portion is eight bits. If there is no prefix in the search space that is nine to sixteen bits long, there is no reason to perform a lookup operation on a prefix portion of the lookup word ranging from bits nine to sixteen as it never will result in a matching prefix.

Thus, in one embodiment, it is possible, that lookup operations will be performed in lookup mechanism 231 and 233, but not lookup mechanism 232 for a particular lookup word. One embodiment uses a data structure and/or memory device to determine this on a per value of a portion basis.

Figure 4B:
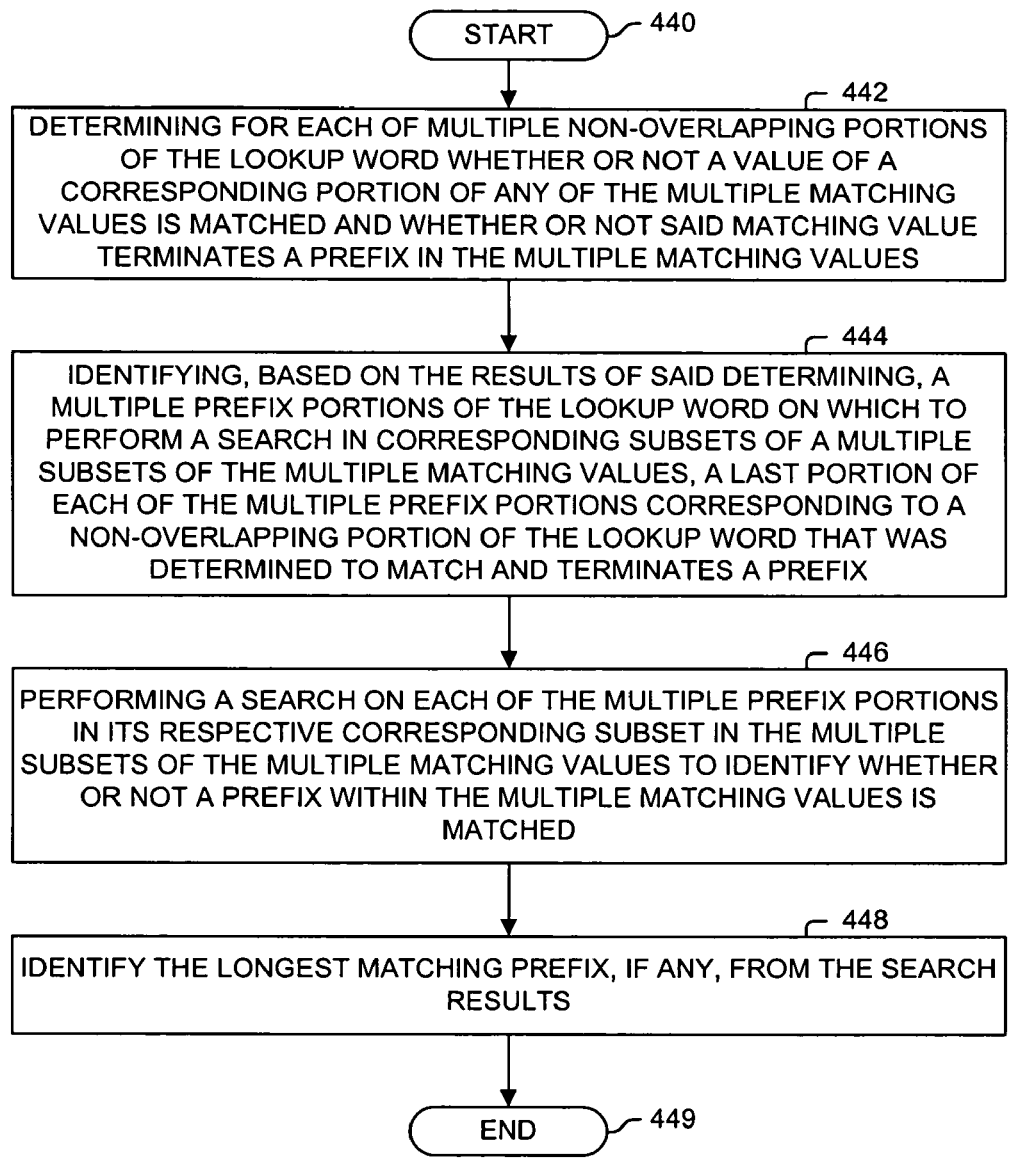
FIG. 4B is a flow diagram of a process used in one embodiment for partitioning and filtering a search space of particular use for determining a longest prefix match thereon.

For example, FIG. 4B illustrates data stored in memory for filtering portions of a lookup word used in one embodiment. For example, if a portion includes eight bits, then there are 256 possible values (assuming a wildcard or don't care value for one or more bits is mapped into a zero or a one). One embodiment, thus uses a memory or data structure 400 indexed by the value 401 of the portion, and includes an indication 402 (e.g., a bit) of whether or not a corresponding portion of at least one of the prefixes in the search space has a corresponding value, and an indication 403 (e.g., a bit) whether or not such value corresponds to a terminated prefix (i.e., a possible matching prefix and not just matching values). This is simple to maintain, and one embodiment also keeps a count of the number of prefixes having each value so it can be easily updated when prefixes are added and removed from the search space.

Figure 2C:
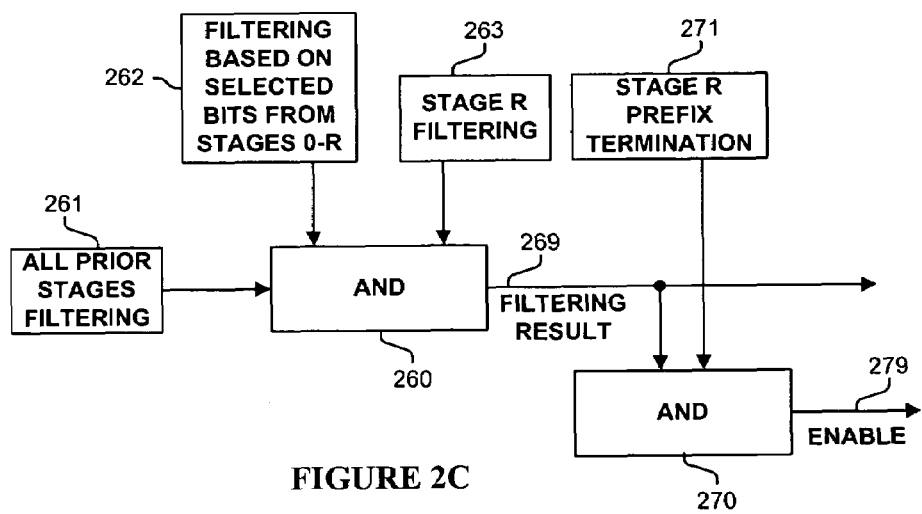
FIG. 2C is a block diagram of exemplary logic circuitry used in one embodiment to identify whether a search should be performed on a particular prefix portion of the lookup word.

FIG. 2C is a block diagram of exemplary logic circuitry used in one embodiment to identify whether a search should be performed on a particular prefix portion of the lookup word based on matching and terminating indications. As shown, the combined result 261 from all filtering of prior portions of the lookup word is ANDed with the filtering result 263 of the current stage (denoted as stage R) to generate filtering result 269 (used further by the stage and typically by any subsequent stages). The indication 271 of whether or not the matching value corresponds to one or more terminated prefixes is ANDed by AND mechanism 270 with filtering result 269 to generate the enable signal 279 (i.e., a possible matching terminating prefix in this corresponding prefix portion of the lookup word so perform the lookup, or no possible matching terminating prefix). In addition, one embodiment also includes additional filtering of some bits from any of the stages 0-R such as which includes bits from different portions of the lookup word, and thus this result 262 is further used as input to AND mechanism 260.

Lookup operations are then performed in lookup mechanisms 231-233 which are identified as having a possible matching terminating prefix.

FIG. 4B is a flow diagram of a process used in one embodiment for partitioning and filtering a search space of particular use for determining a longest prefix match thereon. Processing begins with process block 440, and proceeds to process block 442, wherein a determination is made for each of multiple non-overlapping portions of the lookup word, whether or not a value of a corresponding portion of any of the matching values matches and whether or not the matching value terminates a prefix in the matching values. In process block 444, based on these results, prefix portions of the lookup word on which to perform a search in corresponding subsets of multiple subsets of the matching values are identified, with a last portion of each of the plurality of prefix portions corresponding to a non-overlapping portion of the lookup word that was determined to match and terminates a prefix. In process block 446, a search is performed on each of the prefix portions in its respective corresponding subset to identify whether or not a prefix within the matching values is matched. In process block 448, a longest of the prefix portions that are matched is identified, if any. Processing is complete as indicated by process block 449.

Figure 5:
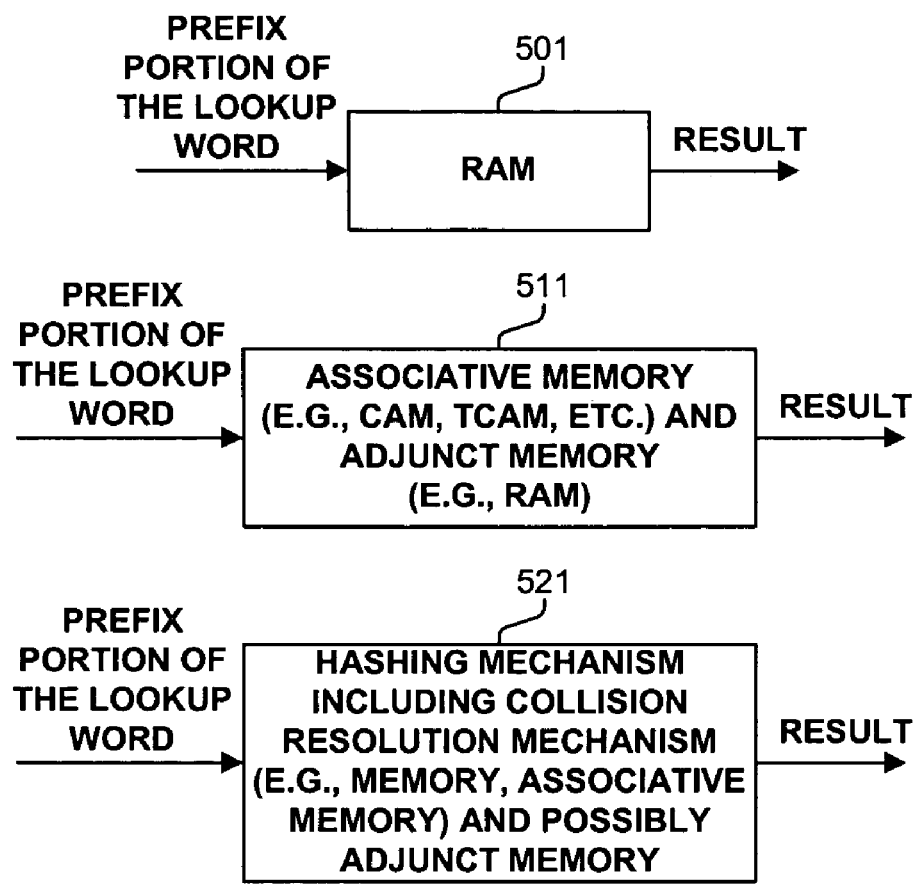
FIG. 5 is a block diagram of some exemplary lookup mechanisms used in one embodiment.

FIG. 5 is a block diagram of some exemplary lookup mechanisms used in one embodiment. Note, any known or future developed lookup mechanism can be used, such as that using devices and methods such as, but not limited to memory, associative memory, hashing, tree bitmap, mtrie, etc. Also, more than one different lookup mechanism can be used, especially to that commensurate with the size of the subset of the search space corresponding to the prefix portion. For example, in one embodiment RAM 501 is used in one embodiment to store indications of whether or not a prefix is in the search space. This is often used when the search space is relatively small, as it is typically easy and cheap to implement. For example, if the lookup prefix is sixteen bits, a 64K bit memory could be used. In one embodiment, an associative memory 511 (e.g., a binary or ternary content-addressable memory is used). In one embodiment, a hashing mechanism 521 is used for performing lookup operations, with collisions being handled by memory lookup operations (e.g., a linked or other list of colliding values) or even a lookup operation in an associative memory to handle collisions.

Figure 6:
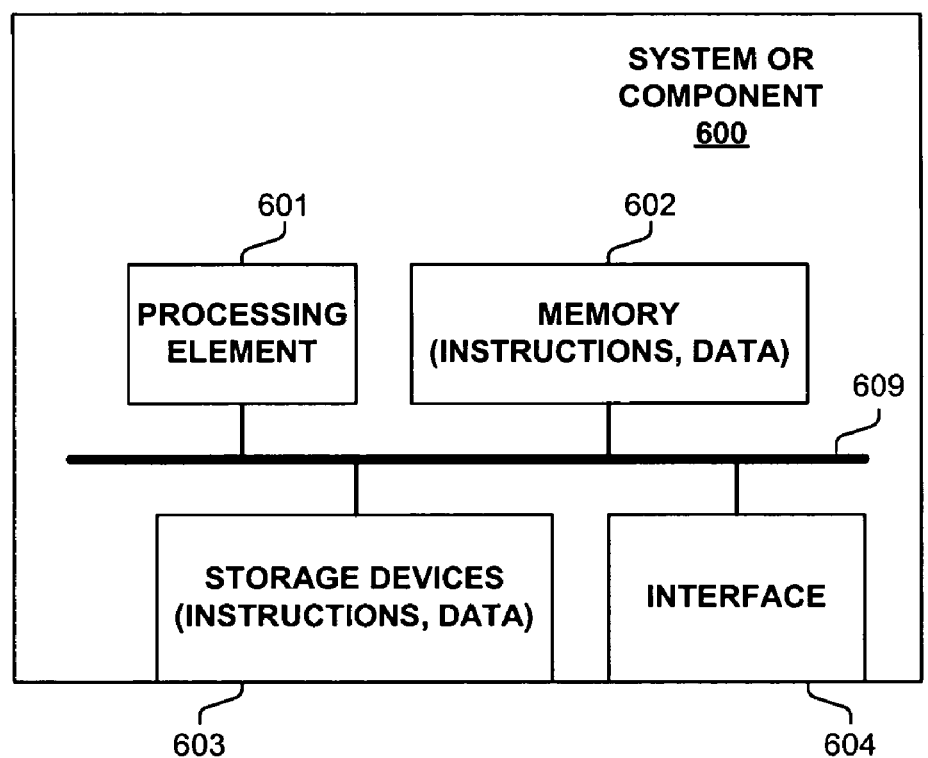
FIG. 6 is a block diagram of a system or component used in one embodiment for partitioning and filtering a search space of particular use for determining a longest prefix match thereon.

FIG. 6 is a block diagram of a system or component 600 used in one embodiment for partitioning and filtering a search space of particular use for determining a longest prefix match thereon. In one embodiment, system or component 600 performs one or more processes corresponding to one of the flow diagrams illustrated or otherwise described herein. For example, in one embodiment, system or component 600 performs the initial filtering of the portions of the lookup word, determines possible matching prefix portions of the lookup word, and/or performs a lookup operation for one or more of the determined possible matching prefix portions of the lookup word.

In one embodiment, system or component 600 includes a processing element 601, memory 602, storage devices 603, an interface 604 for sending and receiving information and/or communicating with external devices (e.g. one or more associative memories for performing a lookup operation), which are typically coupled via one or more communications mechanisms 609, with the communications paths typically tailored to meet the needs of the application. Various embodiments of component 600 may include more or less elements. The operation of component 600 is typically controlled by processing element 601 using memory 602 and storage devices 603 to perform one or more tasks or processes. Memory 602 is one type of computer-readable medium, and typically comprises random access memory (RAM), read only memory (ROM), flash memory, integrated circuits, and/or other memory components. Memory 602 typically stores computer-executable instructions to be executed by processing element 601 and/or data which is manipulated by processing element 601 for implementing functionality in accordance with an embodiment. Storage devices 603 are another type of computer-readable medium, and typically comprise solid state storage media, disk drives, diskettes, networked services, tape drives, and other storage devices. Storage devices 603 typically store computer-executable instructions to be executed by processing element 601 and/or data which is manipulated by processing element 601 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for performing longest-matching prefix lookup operations, the apparatus comprising:
a plurality of lookup filtering modules configured to identify which of a plurality of portions of a lookup word are matched by pre-programmed matching values;
logic circuitry, coupled to the plurality of lookup filtering modules, configured to identify matching prefix consecutive portions based on said plurality of portions of the lookup word identified as being matched, a first consecutive portion of said matching prefix consecutive portions corresponding to a first of the plurality of portions of the lookup word, and each of the remaining of said matching prefix consecutive portions corresponding to the first consecutive portion plus a corresponding one or more subsequent portions of the plurality of portions of the lookup word; and a plurality of lookup modules configured to identify which prefix portions of the lookup word corresponding to said matching prefix consecutive portions identified as being matched are matched by pre-programmed values.

2. The apparatus of claim 1, comprising a selection mechanism configured to identify the longest of said prefix portions identified as being matched by pre-programmed values.

3. The apparatus of claim 1, wherein said pre-programmed matching values are values of any possible matching prefix for corresponding portions of the lookup word.

4. The apparatus of claim 1, wherein the plurality of filtering modules are configured to identify which of the plurality of portions of the lookup word terminate a possible matching prefix.

5. The apparatus of claim 4, wherein a particular one of the plurality of lookup modules is configured not to perform a lookup operation when a corresponding prefix portion of the lookup word is not identified as terminating a possible matching prefix.

6. The apparatus of claim 1, wherein the plurality of portions of the lookup word are non-overlapping portions of the lookup word.

7. The apparatus of claim 1, wherein each of the plurality of filtering modules include a memory configured to store an indication for each possible value of a corresponding said portion of the lookup word, the indication identifying whether or not any of said pre-programmed values has the corresponding possible value for that corresponding portion of the lookup word.

8. The apparatus of claim 1, wherein said configuration to identify which prefix portions are matched by said pre-programmed values includes the plurality of lookup modules being configured to perform a memory, hash table, or associative memory lookup operation based on said prefix portions on the corresponding space identified by said pre-programmed values.

9. The apparatus of claim 1, wherein each of said plurality of lookup modules is configured to operate on a different prefix portion of said prefix portions.

10. The apparatus of claim 1, wherein each of said plurality of lookup filtering modules is configured to operate on a different portion of the plurality of portions of the lookup word.

11. The apparatus of claim 10, wherein each of said plurality of lookup modules is configured to operate on a different prefix portion of said prefix portions.

12. The apparatus of claim 11, wherein each of said different prefix portions corresponds to a prefix ending in a different one of said different portions of the plurality of portions of the lookup word.

13. A method for performing lookup operations based on a lookup word on a space identified by a plurality of matching values, the method comprising:
determining for each of a plurality of non-overlapping portions of the lookup word whether or not a value of a corresponding portion of any of the plurality of matching values matches;
identifying, based on the results of said determining for each of the plurality of non-overlapping portions of the lookup word, a plurality of prefix portions of the lookup word on which to perform a search in corresponding subsets of a plurality of subsets of the plurality of matching values, the plurality of prefix portions including a highest-order portion of the plurality of non-overlapping portions of the lookup word and one or more other prefix portions each including the highest-order portion and one or more consecutive non-overlapping portions of the lookup word from the highest-order portion; and
performing a search on each of the plurality of prefix portions in its respective corresponding subset in the plurality of subsets of the plurality of matching values to identify whether or not a prefix within the plurality of matching values is matched.

14. The method of claim 13, comprising identifying a longest of the plurality of prefix portions that are matched.

15. The method of claim 13, comprising maintaining for each particular portion of the plurality of non-overlapping portions of the lookup word a data structure indicating for which possible values a corresponding portion of any of the plurality of matching values matches.

16. A method for performing lookup operations based on a lookup word on a space identified by a plurality of matching values, the method comprising:
determining for each of a plurality of non-overlapping portions of the lookup word whether or not a value of a corresponding portion of any of the plurality of matching values is matched and whether or not said matching value terminates a prefix in the plurality of matching values;
identifying, based on the results of said determining, a plurality of prefix portions of the lookup word on which to perform a search in corresponding subsets of a plurality of subsets of the plurality of matching values, a last portion of each of the plurality of prefix portions corresponding to a non-overlapping portion of the lookup word that was determined to match and terminates a prefix; and
performing a search on each of the plurality of prefix portions in its respective corresponding subset in the plurality of subsets of the plurality of matching values to identify whether or not a prefix within the plurality of matching values is matched.

17. The method of claim 16, comprising identifying a longest of the plurality of prefix portions that are matched.

18. The method of claim 16, comprising maintaining for each particular portion of the plurality of non-overlapping portions of the lookup word a data structure indicating for which possible values a corresponding portion of any of the plurality of matching values matches.

19. An apparatus for performing lookup operations based on a lookup word on a space identified by a plurality of matching values, the apparatus comprising:
means for determining for each of a plurality of non-overlapping portions of the lookup word whether or not a value of a corresponding portion of any of the plurality of matching values matches;
means for identifying, based on the results of said determining for each of the plurality of non-overlapping portions of the lookup word, a plurality of prefix portions of the lookup word on which to perform a search in corresponding subsets of a plurality of subsets of the plurality of matching values, the plurality of prefix portions including a highest-order portion of the plurality of non-overlapping portions of the lookup word and one or more other prefix portions each including the highest-order portion and one or more consecutive non-overlapping portions of the lookup word from the highest-order portion; and
means for performing a search on each of the plurality of prefix portions in its respective corresponding subset in the plurality of subsets of the plurality of matching values to identify whether or not a prefix within the plurality of matching values is matched.

20. The apparatus of claim 19, comprising means for identifying a longest of the plurality of prefix portions that are matched.

21. The apparatus of claim 19, comprising means for maintaining for each particular portion of the plurality of non-overlapping portions of the lookup word a data structure indicating for which possible values a corresponding portion of any of the plurality of matching values matches.

22. An apparatus for performing lookup operations based on a lookup word on a space identified by a plurality of matching values, the apparatus comprising:
means for determining for each of a plurality of non-overlapping portions of the lookup word whether or not a value of a corresponding portion of any of the plurality of matching values is matched and whether or not said matching value terminates a prefix in the plurality of matching values;
means for identifying, based on the results of said determining, a plurality of prefix portions of the lookup word on which to perform a search in corresponding subsets of a plurality of subsets of the plurality of matching values, a last portion of each of the plurality of prefix portions corresponding to a non-overlapping portion of the lookup word that was determined to match and terminates a prefix; and
means for performing a search on each of the plurality of prefix portions in its respective corresponding subset in the plurality of subsets of the plurality of matching values to identify whether or not a prefix within the plurality of matching values is matched.

23. The apparatus of claim 22, comprising means for identifying a longest of the plurality of prefix portions that are matched.

24. The apparatus of claim 22, comprising means for maintaining for each particular portion of the plurality of non-overlapping portions of the lookup word a data structure indicating for which possible values a corresponding portion of any of the plurality of matching values matches.

* * * * *